United States Patent [19]
Hirano

[11] Patent Number: 5,247,394
[45] Date of Patent: Sep. 21, 1993

[54] READING ZOOM LENS SYSTEM
[75] Inventor: Hiroyuki Hirano, Tokyo, Japan
[73] Assignee: Asahi Kogaku Kogyo K.K., Tokyo, Japan
[21] Appl. No.: 936,218
[22] Filed: Aug. 27, 1992
[30] Foreign Application Priority Data
  Aug. 29, 1991 [JP] Japan .................................. 3-299982
[51] Int. Cl.$^5$ ............................................. G02B 15/14
[52] U.S. Cl. .................................... 359/691; 359/683
[58] Field of Search ............... 359/676, 683, 685, 691, 359/754, 757, 793, 794, 622

[56] References Cited
U.S. PATENT DOCUMENTS
  3,576,358  4/1971  Hayamizu et al. ................... 359/691
  5,144,489  9/1992  Shibayama .......................... 359/692

FOREIGN PATENT DOCUMENTS
  3-240013 10/1991 Japan .................................... 359/676

Primary Examiner—Bruce Y. Arnold
Assistant Examiner—David R. Parsons
Attorney, Agent, or Firm—Sughrue, Mion, Zinn, Macpeak & Seas

[57] ABSTRACT

The improved reading zoom lens system includes, in order from the object side, a front group that has a positive power and that is of a four-unit-six-element composition and a rear group that has a positive power and that is composed of two elements, which lens system is capable of zooming by changing the distance between the front and rear groups and satisfies the following conditions (a) to (c):

(a) $0.90 < fL/fF < 1.10$
(b) $0.09 < fF/fR < 0.35$
(c) $3.0 < (dL - dS)/(fL - fS) < 9.5$ where fL: the focal length of the overall system at the highest magnification;
fS: the focal length of the overall system at the lowest magnification;
fF: the focal length of the front group;
fR: the focal length of the rear group;
dL: the variable distance at the highest magnification; and
dS: the variable distance at the lowest magnification.

The reading zoom lens system is suitable for use with an image reading apparatus and capable of reading image data faithful to the document with a desired resolution but without unduly extending the electrical processing time.

6 Claims, 6 Drawing Sheets

FRONT GROUP   REAR GROUP

READING ZOOM LENS SYSTEM

BACKGROUND OF THE INVENTION

This application is based upon Japanese Patent Application No. HEI. 3-299982 filed Aug. 29, 1991, a disclosure of which is incorporated by reference.

This invention relates to an improvement of reading zoom lens systems for use with image input apparatus such as a facsimile and a scanner.

Variable resolutions have been one of the capabilities that are increasingly required to be possessed by recent models of image input apparatus including facsimiles and scanners. Reading lens systems to be used with this class of image input apparatus are usually fixed as regards the operating magnification but, on the other hand, such reading lens systems are desirably adapted for zooming since they are required to have performance. However, zooming with conventional reading lens systems is frequently impractical since aberrations such as curvature of the field will develop in increasing amounts. Even if this is possible, the applicability has been limited to the use at magnifications around the reference design value.

To overcome this difficulty and attain a desired resolution, various methods have been adopted and three typical examples are as follows: a plurality of scanners having different resolutions are used selectively; optical systems having different resolutions are incorporated in a single scanner and used in a selective manner; or the resolution is varied by electrical signal processing. However, these methods have had their own disadvantages. The first and second methods require a plurality of scanners or optical systems to attain the necessary resolutions and, furthermore, it is impossible to attain resolutions other than those offered by the scanners or optical systems provided for the lens system. In the third method which changes the resolution electrically, resolutions other than the reference value are rendered to appear as if they were the desired resolution by performing an appropriate processing on the readout data such as interpolation or subsampling but this is either time-consuming or somewhat poor in reproducibility.

SUMMARY OF THE INVENTION

The present invention has been accomplished under these circumstances and has as an object providing a reading zoom lens system that is suitable for use with an image reading apparatus and which is capable of reading image data faithful to the document with a desired resolution but without unduly extending the electrical processing time.

This object of the present invention can be attained by a reading zoom lens system that comprises, in order from the object side, a front group that has a positive power and that is a four-unit-six-element composition and a rear group that has a positive power and that is composed of two elements, which lens system is capable of zooming by changing the distance between said front and rear groups and satisfies the following conditions (a) to (c):

(a) $0.90 < fL/fF < 1.10$
(b) $0.09 < fF/fR < 0.35$
(c) $3.0 < (dL-dS)/(fL-fS) < 9.5$ where fL: the focal length of the overall system at the highest magnification;
fS: the focal length of the overall system at the lowest magnification;
fF: the focal length of the front group;
fR: the focal length of the rear group;
dL: the variable distance at the highest magnification; and
dS: the variable distance at the lowest. magnification.

DETAILED DESCRIPTION OF THE INVENTION

Figure 1:
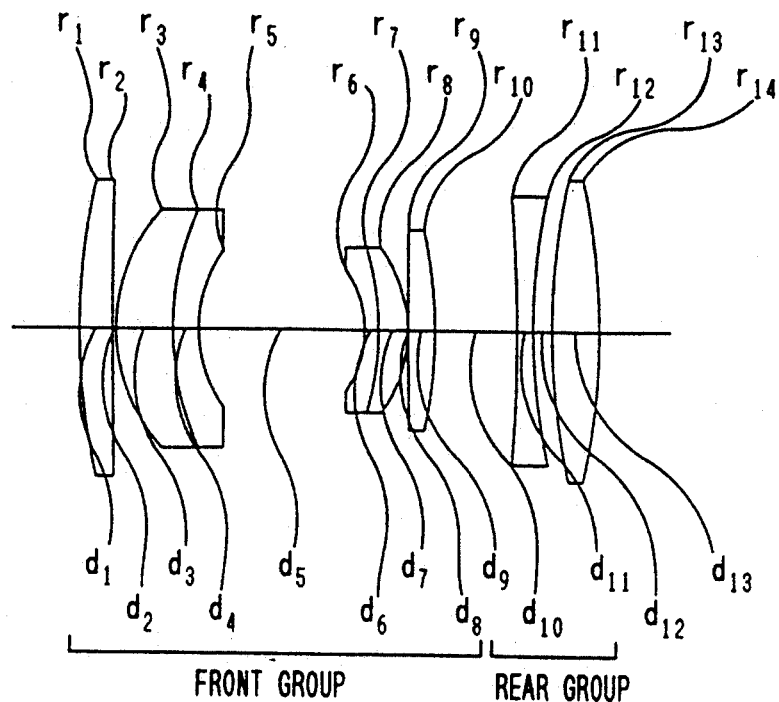
FIG. 1 is a simplified cross-sectional view showing a reading zoom lens system according to Example 1 of the present invention.

Examples of the reading zoom lens system of the present invention are described below with reference to the accompanying drawings.

The reading zoom lens system of the example under discussion comprises, in order from the object side, a front group that has a positive power and that is of a four-unit-six-element composition and a rear group that has a positive power and that is composed of two elements, which lens system is capable of zooming by changing the distance between said front and rear groups and satisfies the following conditions (a) to (c):

(a) $0.90 < fL/fF < 1.10$
(b) $0.09 < fF/fR < 0.35$
(c) $3.0 < (dL/dS)/(fL-fS) < 9.5$ where fL: the focal length of the overall system at the highest magnification;
fS: the focal length of the overall system at the lowest magnification;
fF: the focal length of the front group;

fR: the focal length of the rear group;
dL: the variable distance at the highest magnification; and
dS: the variable distance at the lowest magnification.

Conditions (a) to (c) should each be satisfied in order to attain balance between the front and rear groups. Condition (a) specifies the power of the front group. If the upper limit of this condition is exceeded, the power of the front group is so strong that it becomes difficult to control the movement of the front group during zooming. If, on the other hand, the lower limit of condition (a) is not reached, the power of the front group is so weak that the amount of movement of the front group during zooming is large enough to deteriorate the space efficiency.

Condition (b) specifies the power ratio between the front and rear groups. If this condition is not met, it becomes difficult to perform zooming while balance is attained between various factors such as controlled movement, performance and space efficiency.

Condition (c) specifies the amount of change in the variable distance relative to the amount of change in magnification. If the upper limit of this condition is exceeded, the overall length of the lens system will change so greatly as to deteriorate the space efficiency. If, on the other hand, the lower limit of condition (c) is not reached, the sensitivity of the groups becomes so high that an unduly high precision is required for lens manufacturing.

The reading zoom lens system of the examples under consideration preferably satisfies the following additional conditions (d) to (g):

(d) $0.15 < (d1+d2+d3+d4)/fF < 0.25$
(e) $0.10 < (d6+d7+d8+d9)/fF < 0.15$
(f) $1.5 < f1/fF < 2.0$
(g) $1.0 < f6/fF < 1.3$ where fi: the focal length of the i-th lens; and
di: the distance between the i-th lens surface and the (i+1)-th surface.

Conditions (d) and (e) both relate to coma. If those conditions are not met, it is difficult to achieve effective correction of coma.

Conditions (f) and (g) both determine the power distribution in the front group. If these conditions are not met, it is difficult to correct various aberrations.

If the reading zoom lens of the examples under discussion is to be applied to a color image input apparatus, it preferably satisfies the following conditions (h) to (l) in addition to conditions (a) to (g):

(h) $1.65 < (n1+n2)/2 < 1.80$
(i) $1.65 < (n5+n6)/2 < 1.80$
(j) $20 < \nu 2 - \nu 3 < 28$
(k) $10 < \nu 5 - \nu 4 < 18$
(l) $20 < \nu 1 + \nu 3 - \nu 2 < 31$ where ni: the refractive index of the i-th lens at the e-line; and
$\nu$i: the Abbe number of the i-th lens at the d-line.

Conditions (h) and (i) both relate to lateral chromatic aberration. If these conditions are not met, it is difficult to achieve effective correction of lateral chromatic aberration.

Conditions (j), (k) and (l) all relate to axial chromatic aberration. If these conditions are not met, it is difficult to achieve effective correction of axial chromatic aberration.

More preferably, the reading zoom lens of the examples under consideration is such that the rear group comprises a negative and a positive lens element that are arranged in order from the object side and that the following condition (m) is satisfied:

(m) $|fR/(\nu 7 \cdot f7) + fR/(\nu 8 \cdot fS)| < 0.035$

Condition (m) relates to axial chromatic aberration that can develop in the rear group. If this condition is not, undesirably large variations will occur in chromatic aberration during zooming.

Three examples of the reading zoom lens system of the present invention are described below with reference to specific numerical data sheets, in which f denotes the focal length at the e-line, fB, the back focus, r, the radius of curvature of an individual lens surface, d, the lens thickness or the airspace between lens elements (f, fB, r and d are expressed in millimeters), Fno., the F number, n, the refractive index of an individual lens element at the e-line, and $\nu$, the Abbe number of an individual lens element at the d-line. The lens systems described in the following examples were applied to an image reading apparatus that was capable of handling documents of size A3 at resolutions of 600 to 400 dpi, that had a copy glass thickness of 5.0 mm, and that used a CCD sensor with a cover glass thickness of 0.7 mm.

According to the present invention, it is preferable that the front lens group includes, in order from the object side, a positive meniscus lens element, a positive lens element cemented to a negative lens element, a negative lens element cemented to a positive lens element, and a positive lens element.

EXAMPLE 1

Figure 2:
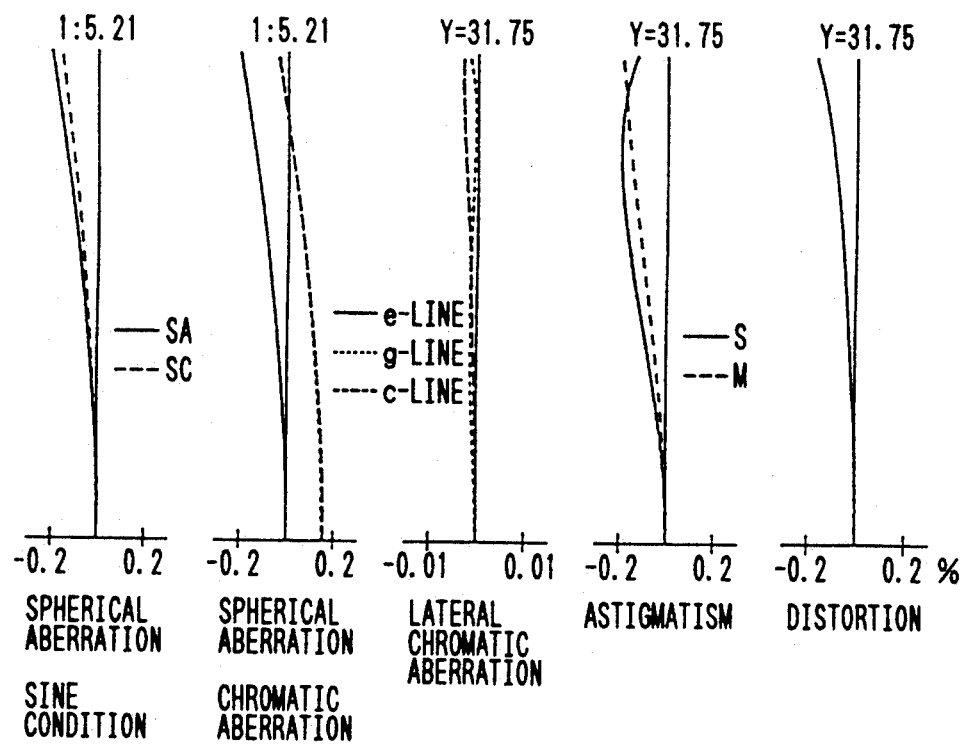
FIG. 2 is a set of graphs plotting the aberration curves obtained with the reading zoom lens system of Example 1 at high magnification.
Figure 3:
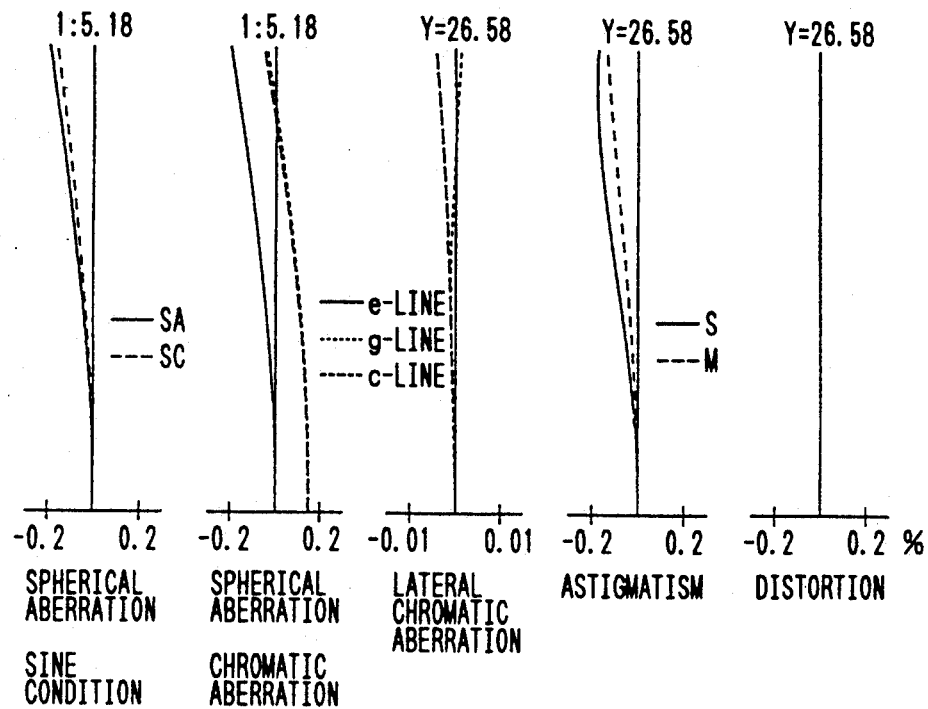
FIG. 3 is a set of graphs plotting the aberration curves obtained with the reading zoom lens system of Example 1 at medium magnification.
Figure 4:
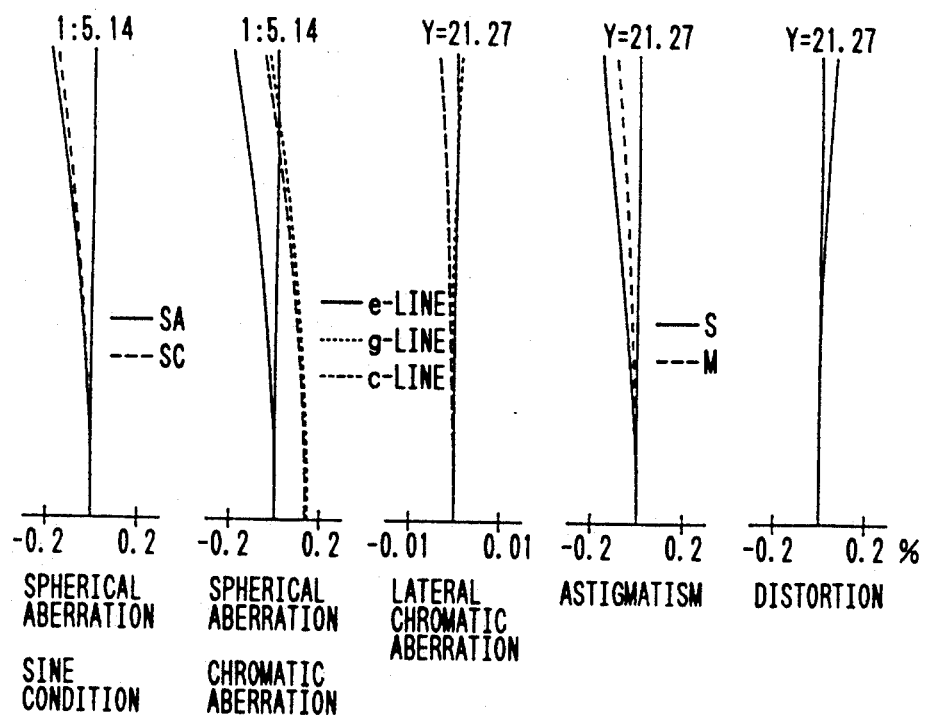
FIG. 4 is a set of graphs plotting the aberration curves obtained with the reading zoom lens system of Example 1 at low magnification.

FIG. 1 is a simplified cross-sectional view showing the lens system of Example 1. A specific data sheet for this lens system is given in Table 1. Graphs plotting the aberration curves obtained with this lens system at high magnification are given in FIG. 2; graphs plotting the aberration curves obtained at medium magnification are given in FIG. 3; and graphs plotting the aberration curves obtained at low magnification are given in FIG. 4. The lens system of Example 1 undergoes changes in back focus during zooming; however, the ratio of the amount of movement of the rear group to the amount of movement of the front group is adjusted to be constant at any magnification so that it can be controlled by a simple mechanistic device such as a cam mechanism.

TABLE 1

| | Operating magnification: −0.214 to −0.143 | | | |
|---|---|---|---|---|
| Surface No. | r | d | n | $\nu$ |
| 1 | 91.414 | 5.000 | 1.67003 | 47.3 |
| 2 | 1072.816 | 0.475 | | |
| 3 | 25.215 | 8.418 | 1.72916 | 54.7 |
| 4 | 42.346 | 3.708 | 1.72825 | 28.5 |
| 5 | 19.441 | 24.339 | | |
| 6 | −15.057 | 2.000 | 1.64769 | 33.8 |
| 7 | −41.046 | 4.422 | 1.74400 | 44.8 |
| 8 | −19.603 | 0.100 | | |
| 9 | 1727.175 | 4.000 | 1.58313 | 59.4 |
| 10 | −65.135 | variable | | |
| 11 | −216.331 | 2.500 | 1.76182 | 26.6 |
| 12 | 89.267 | 2.784 | | |
| 13 | 99.749 | 7.000 | 1.74950 | 35.3 |
| 14 | −99.749 | ∞ | | |

The values of Fno., f, fB and d10 will vary during zooming as set forth in Table 2.

TABLE 2

|  | L | M | S |
|---|---|---|---|
| magnification | −0.214 | −0.178 | −0.143 |
| FNo. | 5.21 | 5.18 | 5.14 |
| f | 82.60 | 82.02 | 81.45 |
| fB | 50.05 | 48.53 | 47.32 |
| d10 | 12.236 | 10.169 | 8.110 |

EXAMPLE 2

Figure 5:
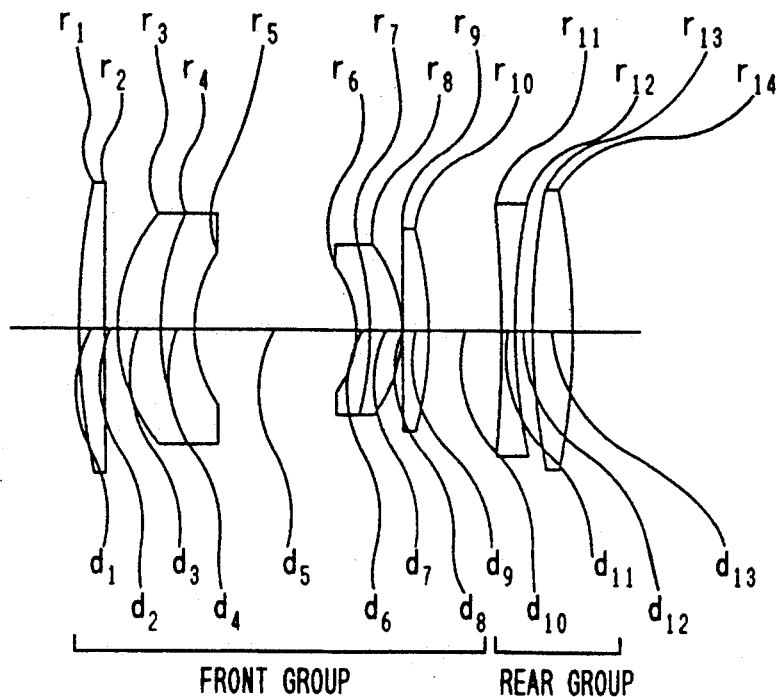
FIG. 5 is a simplified cross-sectional view showing a reading zoom lens system according to Example 2 of the present invention.
Figure 6:
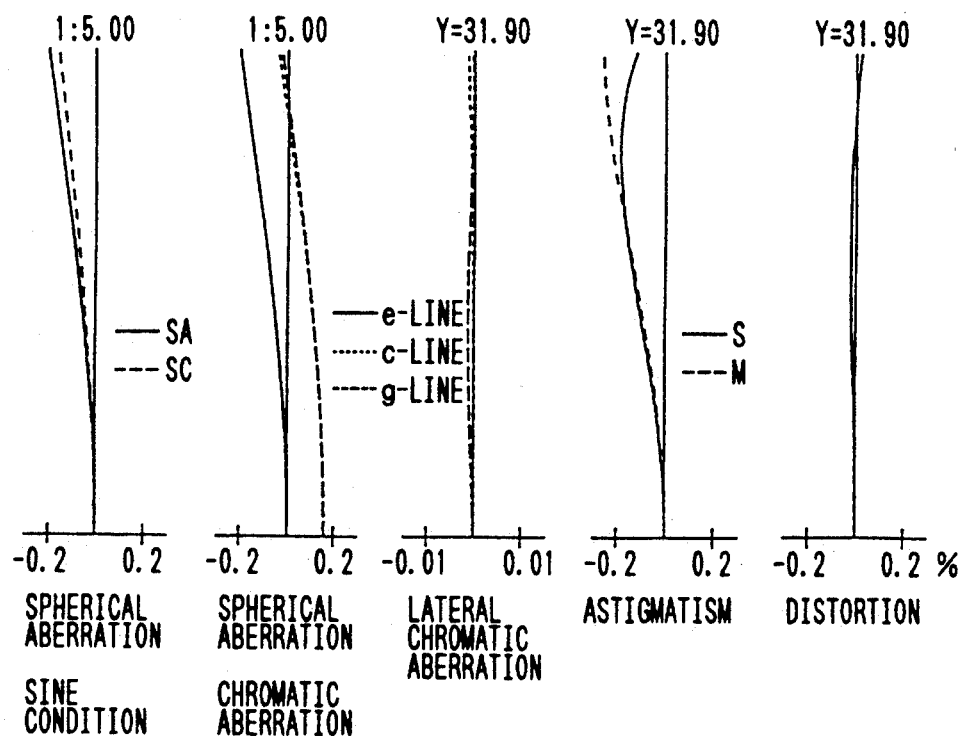
FIG. 6 is a set of graphs plotting the aberration curves obtained with the reading zoom lens system of Example 2 at high magnification.
Figure 7:
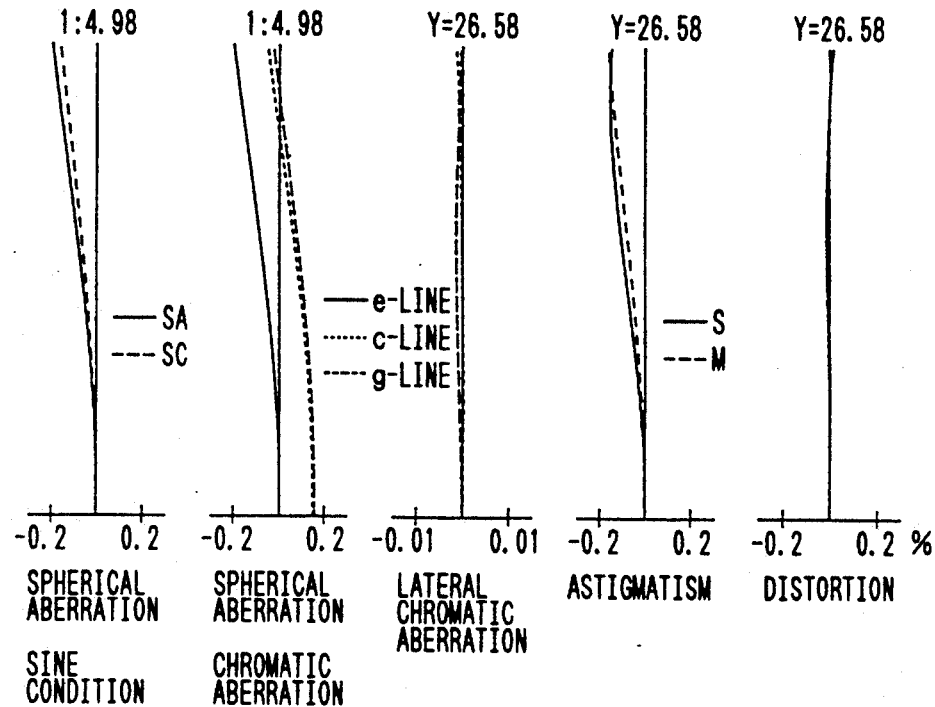
FIG. 7 is a set of graphs plotting the aberration curves obtained with the reading zoom lens system of Example 2 at medium magnification.
Figure 8:
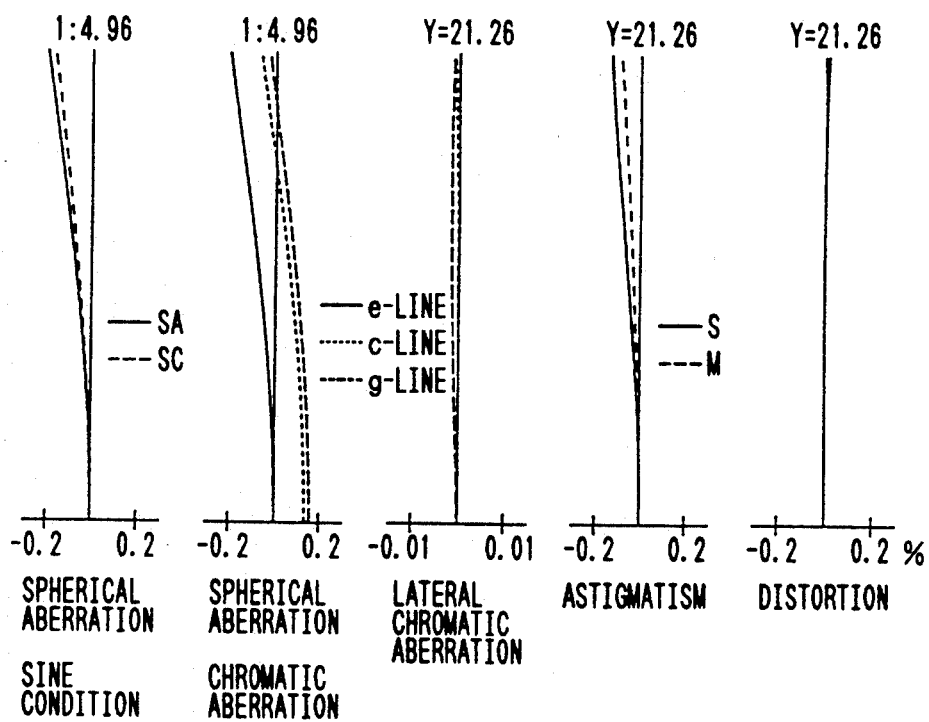
FIG. 8 is a set of graphs plotting the aberration curves obtained with the reading zoom lens system of Example 2 at low magnification.

FIG. 5 is a simplified cross-sectional view showing the lens system of Example 2. A specific data sheet for this lens system is given in Table 3. Graphs plotting the aberration curves obtained with this lens system at the highest magnification (−0.214) are given in FIG. 6; graphs plotting the aberration curves obtained at medium magnification (−0.178) are given in FIG. 7; and graphs plotting the aberration curves obtained at the lowest magnification (−0.143) are given in FIG. 8. The lens system of Example 2 will undergo no change in back focus during zooming. Since the distance between the rear group and the CCD sensor (light-receiving plane) i.e., a so-called backfocus remains the same throughout zooming, the lens system of Example 2 is mechanistically simpler than the system of Example 1 and this contributes to a lower cost and higher reliability.

TABLE 3

| Operating magnification: −0.214 to −0.143 | | | | |
|---|---|---|---|---|
| Surface No. | r | d | n | ν |
| 1 | 97.605 | 3.900 | 1.65844 | 50.9 |
| 2 | 1559.956 | 1.971 | | |
| 3 | 25.615 | 6.495 | 1.74320 | 49.3 |
| 4 | 38.730 | 4.985 | 1.74000 | 28.3 |
| 5 | 19.387 | 23.988 | | |
| 6 | −15.208 | 2.000 | 1.62588 | 35.7 |
| 7 | −46.363 | 4.641 | 1.74100 | 52.6 |
| 8 | −20.060 | 0.100 | | |
| 9 | 3029.030 | 3.833 | 1.60311 | 60.7 |
| 10 | −54.330 | variable | | |
| 11 | −182.111 | 2.000 | 1.80518 | 25.4 |
| 12 | 88.168 | 2.647 | | |
| 13 | 102.568 | 5.967 | 1.72825 | 28.5 |
| 14 | −102.568 | ∞ | | |

The values of Fno., f, fB and d10 will vary during zooming as set forth in Table 4.

TABLE 4

|  | L | M | S |
|---|---|---|---|
| magnification | −0.214 | −0.178 | −0.143 |
| FNo. | 5.00 | 4.98 | 4.96 |
| f | 82.04 | 81.72 | 81.40 |
| fB | 56.99 | 56.99 | 56.99 |
| d10 | 4.665 | 7.586 | 10.500 |

The values of back focus listed above are those which include the thickness of the cover glass of CCD sensor.

EXAMPLE 3

Figure 9:
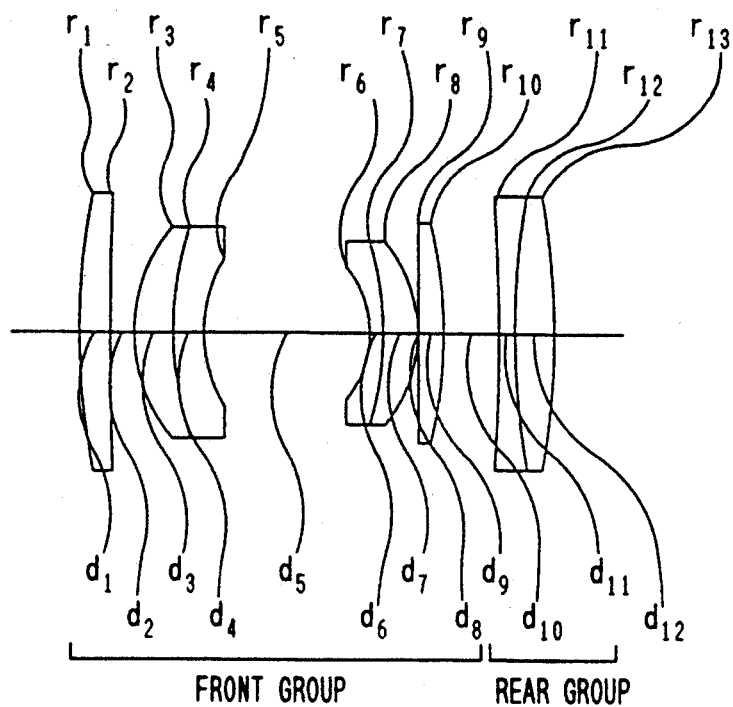
FIG. 9 is a simplified cross-sectional view showing a reading zoom lens system according to Example 3 of the present invention.
Figure 10:
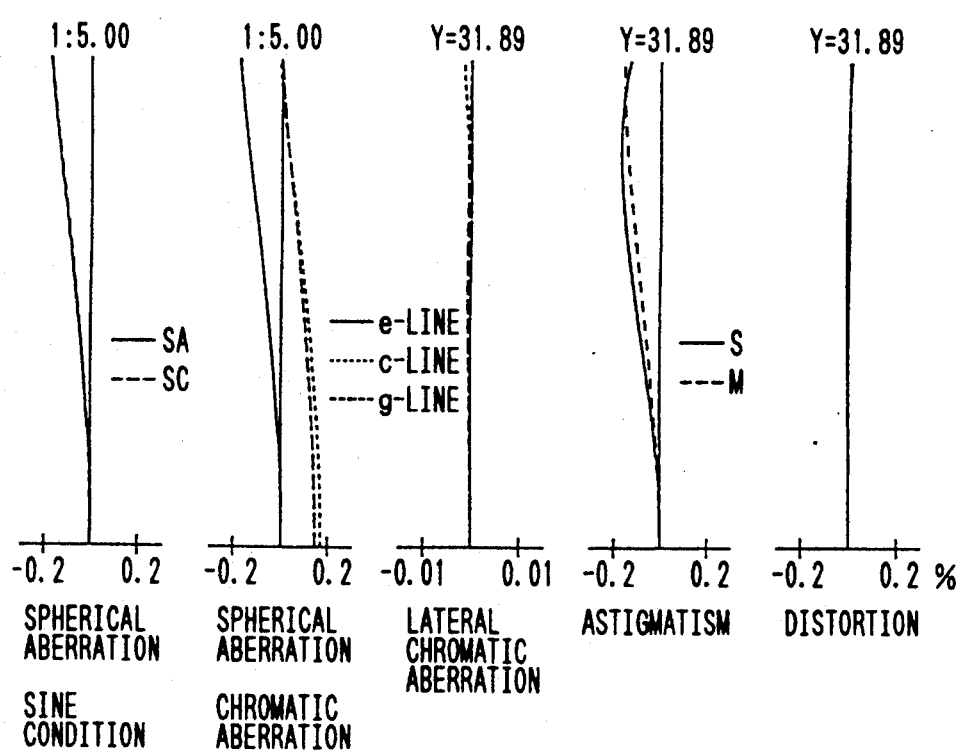
FIG. 10 is a set of graphs plotting the aberration curves obtained with the reading zoom lens system of Example 3 at high magnification.
Figure 11:
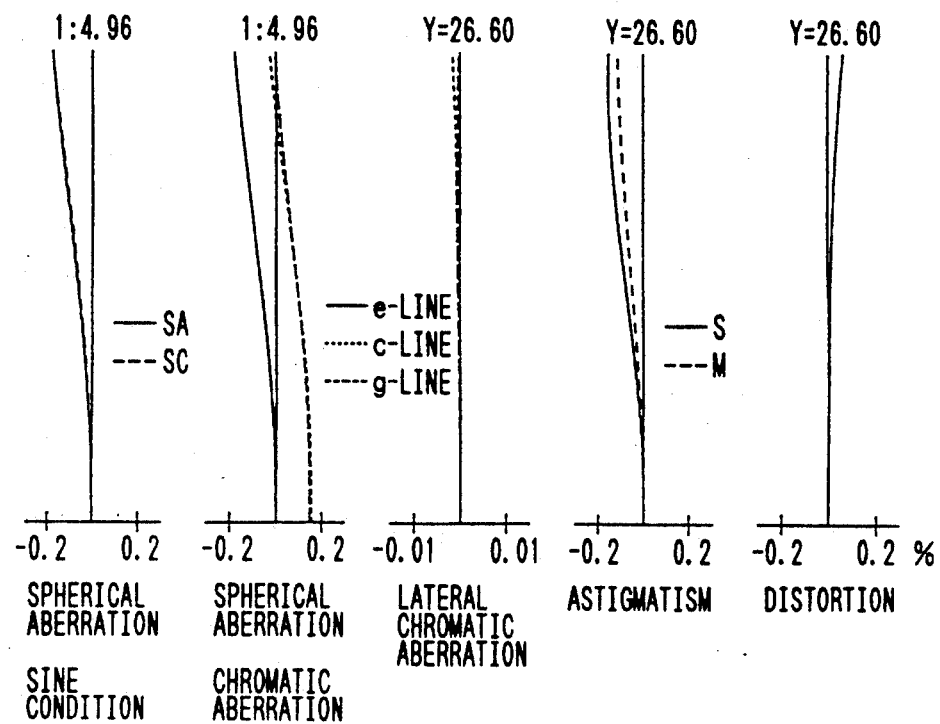
FIG. 11 is a set of graphs plotting the aberration curves obtained with the reading zoom lens system of Example 3 at medium magnification.
Figure 12:
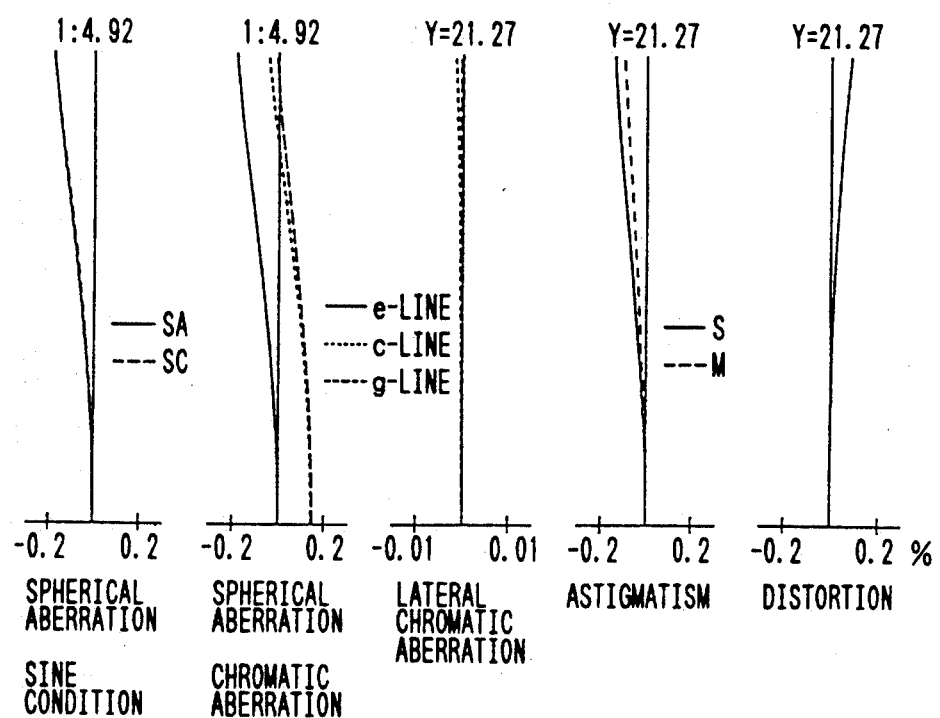
FIG. 12 is a set of graphs plotting the aberration curves obtained with the reading zoom lens system of Example 3 at low magnification.

FIG. 9 is a simplified cross-sectional view showing the lens system of Example 3. A specific data sheet for this lens system is given in Table 5. Graphs plotting the aberration curves obtained with this lens system at the highest magnification are given in FIG. 10; graphs plotting the aberration curves obtained at medium magnification are given in FIG. 11; and graphs plotting the aberration curves obtained at the lowest magnification are given in FIG. 12. The lens system of Example 3 will undergo no change in backfocus during zooming. The lens elements in the rear group are cemented together and the resulting one-group-two-element composition offers one more advantage to the lens system of Example 3 which retains the merits of Example 2; that is, the construction of the lens barrel is sufficiently simplified to achieve further cost reduction and higher reliability.

TABLE 5

| Operating magnification: −0.214 to −0.143 | | | | |
|---|---|---|---|---|
| Surface No. | r | d | n | ν |
| 1 | 102.957 | 4.500 | 1.74320 | 49.3 |
| 2 | 540.000 | 3.640 | | |
| 3 | 23.860 | 5.690 | 1.74100 | 52.6 |
| 4 | 50.000 | 4.440 | 1.71736 | 29.5 |
| 5 | 20.325 | 24.400 | | |
| 6 | −14.548 | 2.000 | 1.66680 | 33.1 |
| 7 | −43.733 | 5.260 | 1.77250 | 49.6 |
| 8 | −20.160 | 0.100 | | |
| 9 | ∞ | 3.790 | 1.60717 | 40.3 |
| 10 | −65.760 | variable | | |
| 11 | −287.519 | 2.480 | 1.80518 | 25.4 |
| 12 | 109.125 | 5.940 | 1.67270 | 32.1 |
| 13 | −109.125 | ∞ | | |

The values of Fno., f, fB and d10 will vary during zooming as set forth in Table 6.

TABLE 6

|  | L | M | S |
|---|---|---|---|
| magnification | −0.214 | −0.178 | −0.143 |
| FNo. | 5.00 | 4.96 | 4.92 |
| f | 81.08 | 80.50 | 79.93 |
| fB | 54.20 | 54.20 | 54.20 |
| d10 | 1.276 | 4.708 | 8.130 |

The values of back focus listed above are those which include the thickness of the cover glass of CCD sensor.

Conditions (a) to (m) are satisfied by the lens systems of Examples 1 to 3 as set forth in Table 7 below, where all calculations are based on the focal lengths and refractive indices at the e-line.

TABLE 7

| Condition | Example 1 | Example 2 | Example 3 |
|---|---|---|---|
| fL/fF | 0.940 | 1.010 | 0.935 |
| fF/fR | 0.320 | 0.109 | 0.195 |
| (dL−dS)/(fL−fS) | 3.585 | 9.087 | 5.931 |
| (d1 + d2 + d3 + d4)/fF | 0.200 | 0.214 | 0.211 |
| (d6 + d7 + d8 + d9)/fF | 0.120 | 0.130 | 0.129 |
| f1/fF | 1.685 | 1.936 | 1.957 |
| f6/fF | 1.221 | 1.086 | 1.242 |
| (n1 + n2)/2 | 1.703 | 1.704 | 1.746 |
| (n5 + n6)/2 | 1.667 | 1.675 | 1.693 |
| ν2−ν3 | 26.200 | 21.000 | 23.200 |
| ν5 − ν4 | 11.000 | 17.000 | 16.600 |
| ν1 + ν3 − ν2 | 21.100 | 29.900 | 26.100 |
| \|fR/(ν7·f7) + fR/(ν8·fS)\| | 0.00910 | 0.03428 | 0.01017 |

As described on the foregoing pages, the present invention provides a reading zoom lens system for use with an image reading apparatus that is capable of changing the resolution between ca. 600 dpi and 400 dpi and this lens system insures that image data faithful to documents of a size of about A3 can be read at a desired resolution without unduly extending the electrical processing time.

What is claimed is:

1. A reading zoom lens system that comprises, in order from the object side, a front group that has a positive power and that is of a four-unit-six-element composition and a rear group that has a positive power and that is composed of two elements, which lens system is capable of zooming by changing the distance between said front and rear groups and satisfies the following conditions (a) to (c):

(a) $0.90 < fL/fF < 1.10$
(b) $0.09 < fF/fR < 0.35$
(c) $3.0 < (dL-dS)/(fL-fS) < 9.5$ where fL: the focal length of the overall system at the highest magnification;
  fS: the focal length of the overall system at the lowest magnification;
  fF: the focal length of the front group;
  fR: the focal length of the rear group;
  dL: the variable distance at the highest magnification; and
  dS: the variable distance at the lowest magnification.

2. A reading zoom lens system according to claim 1 further satisfying the following conditions (d) to (g):

(d) $0.15 < (d1+d2+d3+d4)/fF < 0.25$
(e) $0.10 < (d6+d7+d8+d9)/fF < 0.15$
(f) $1.5 < f1/fF < 2.0$
(g) $1.0 < f6/fF < 1.3$ where fi: the focal length of the i-th lens; and
  di: the distance between the i-th lens surface and the (i+1)-th surface.

3. A reading zoom lens system according to claim 2 wherein said front group further satisfies the following conditions (h) to (l):

(h) $1.65 < (n1+n2)/2 < 1.80$
(i) $1.65 < (n5+n6)/2 < 1.80$
(j) $20 < \nu2-\nu3 < 28$
(k) $10 < \nu5-\nu4 < 18$
(l) $20 < \nu1+\nu3-\nu2 < 31$ where ni: the refractive index of the i-th lens at the e-line; and
  $\nu$i: the Abbe number of the i-th lens at the d-line.

4. A reading zoom lens system according to claim 1 wherein said rear group comprises, in order from the object side, a negative lens element and a positive lens element and further satisfies the following condition (m):

(m) $|fR/(\nu7 \cdot f7) + fR/(\nu8 \cdot fS)| < 0.035$

5. A reading zoom lens system according to claim 1 wherein the distance between the last lens surface and the light-receiving plane facing said last lens surface is variable during zooming.

6. A reading zoom lens system according to claim 1 wherein the distance between the last lens surface and the light-receiving plane facing said last lens surface is invariable during zooming.

* * * * *